US 6,317,609 B1

(12) United States Patent
Alperovich et al.

(10) Patent No.: US 6,317,609 B1
(45) Date of Patent: Nov. 13, 2001

(54) SYSTEM AND METHOD FOR TRANSPORTING DIGITAL SPEECH AND DIGITAL PICTURES

(75) Inventors: Vladimir Alperovich, Dallas; Eric Valentine; Walt Evanyk, both of Plano, all of TX (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/223,298

(22) Filed: Dec. 30, 1998

(51) Int. Cl.$^7$ ................................................. H04M 1/00
(52) U.S. Cl. ..................... 455/556; 455/422; 455/445; 455/517; 455/428; 455/15; 455/16
(58) Field of Search ...................... 455/422, 445, 455/560, 428, 15, 16, 18, 19, 517, 556, 557; 370/352, 353, 354, 356

(56) References Cited

U.S. PATENT DOCUMENTS

| | | | |
|---|---|---|---|
| 5,697,067 | * 12/1997 | Graham et al. | 455/523 |
| 5,825,759 | * 10/1998 | Liu | 370/331 |
| 5,946,629 | * 8/1999 | Sawywer et al. | 455/466 |
| 5,991,627 | * 11/1999 | Honkasalo et al. | 455/437 |
| 6,148,209 | * 11/2000 | Hamalainen et al. | 455/450 |
| 6,160,804 | * 12/2000 | Ahmed et al. | 370/349 |

* cited by examiner

Primary Examiner—Daniel Hunter
Assistant Examiner—Yemane Woldetatios
(74) Attorney, Agent, or Firm—Jenkens & Gilchrist, P.C.

(57) ABSTRACT

A telecommunications system and method for transmitting digital images produced by a digital camera attached to or integrated with a mobile station (MS) from the MS to a receiving terminal through the Internet. A calling mobile subscriber can select the digital image to transmit and dial the number associated with the receiving terminal on the MS. The digital image is then sent in parallel through the Internet while a telecommunications connection, such as a call setup request, is being sent through the cellular or fixed network. At the end office serving the receiving terminal, the call setup request is associated with the digital image and a call connection is established between the calling MS and the receiving terminal. When the call connection is established, the end office serving the receiving terminal sends the digital image to the receiving terminal.

37 Claims, 5 Drawing Sheets

SYSTEM AND METHOD FOR TRANSPORTING DIGITAL SPEECH AND DIGITAL PICTURES

BACKGROUND OF THE PRESENT INVENTION

FIELD OF THE INVENTION

The present invention relates generally to telecommunications systems and methods for transmission of digital images from a mobile station within a cellular network, and specifically to the transmission of digital images obtained by a digital camera associated with a mobile station in association with a call connection.

BACKGROUND AND OBJECTS OF THE PRESENT INVENTION

Cellular telecommunications is one of the fastest growing and most demanding telecommunications applications. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio system.

Figure 1:
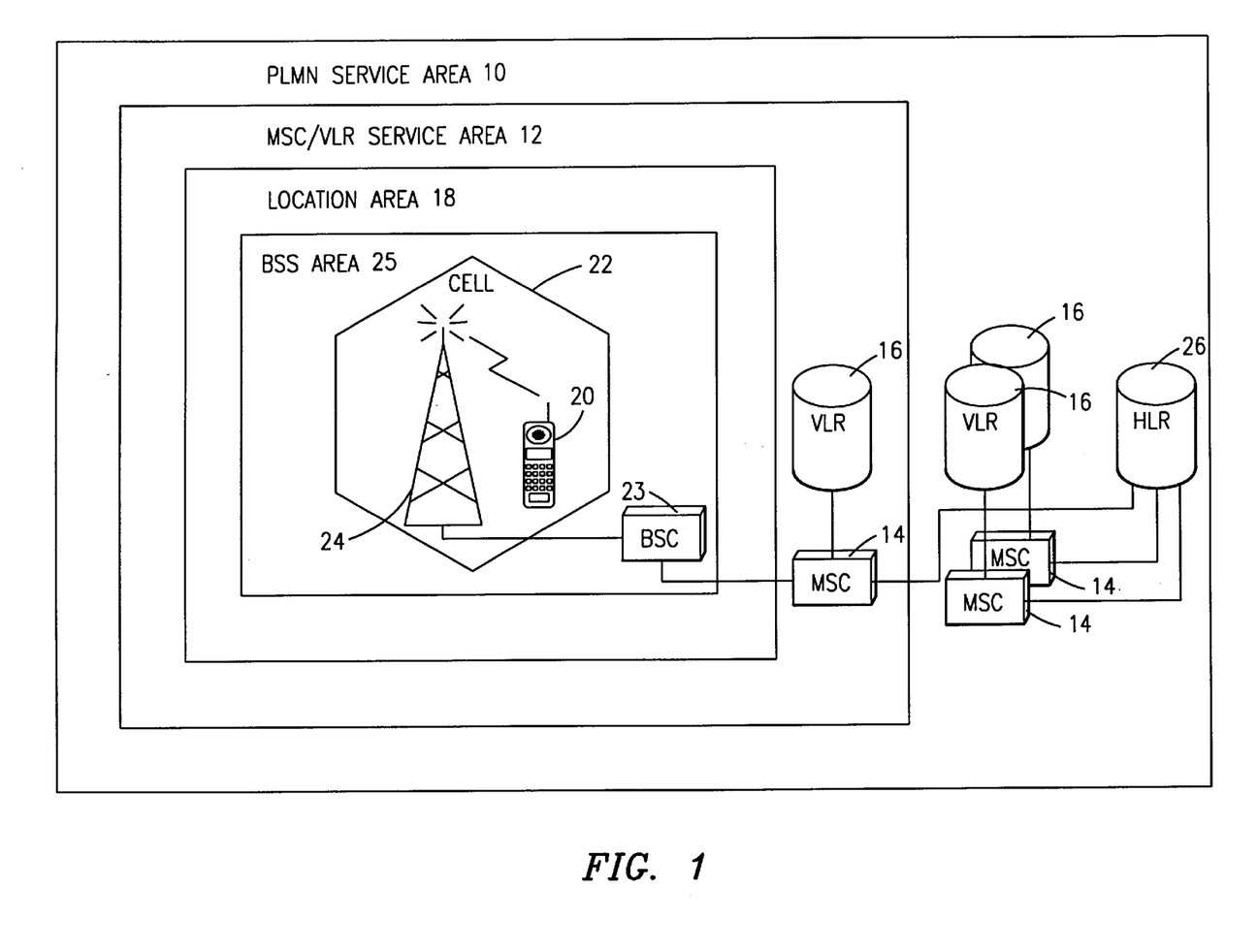
FIG. 1 is a block diagram of a conventional wireless telecommunications system.

With reference now to FIG. 1 of the drawings, there is illustrated a GSM Public Land Mobile Network (PLMN), such as wireless network 10, which in turn is composed of a plurality of areas 12, each with a Mobile Services Switching Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) 20 may move freely without having to send update location information to the MSC/VLR area 12 that controls the LA 18. Each Location Area 18 is divided into a number of cells 22. Mobile Station (MS) 20 is the physical equipment, e.g., a car phone or other portable phone, used by mobile subscribers to communicate with the wireless network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS 24 is the physical equipment, illustrated for simplicity as a radio tower, that provides radio coverage to the geographical part of the cell 22 for which it is responsible. It should be understood that the BSC 23 may be connected to several BTSs 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or wireless network 10 includes a Home Location Register (HLR) 26, which is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or, alternatively, can service multiple MSCs 14, the latter of which is illustrated in FIG. 1.

The VLR 16 is a database containing information about all of the MSs 20 currently located within the MSC/VLR area 12. If an MS 20 roams into a new MSC/VLR area 12, the VLR 16 connected to that MSC 14 will request data about that MS 20 from its home HLR database 26 (simultaneously informing the HLR 26 about the current location of the MS 20). Accordingly, if the user of the MS 20 then wants to make a call, the local VLR 16 will have the requisite identification information without having to reinterrogate the home HLR 26. In the aforedescribed manner, the VLR and HLR databases 16 and 26, respectively, contain various subscriber information associated with a given MS 20.

When an MS 20 places a call to a subscriber, for example, another mobile subscriber (not shown) the MS 20 sends a call setup request along with the dialed B-number associated with the called mobile subscriber to the serving MSC/VLR 14/16. The MSC/VLR 14/16 requests the BSC 23 to allocate a free traffic channel, which is forwarded to the BTS 24 and the MS 20 to activate the allocated traffic channel. The MSC/VLR 14/16 queries the HLR (not shown) associated with the called mobile subscriber to determine the MSC/VLR (not shown) currently serving the called mobile subscriber. The MSC/VLR 14/16 forwards the call to the MSC/VLR serving the called mobile subscriber to establish a call connection between the MS 20 and the called mobile subscriber.

With the advent of Internet telephony services, a mobile subscriber now can choose to route a wireless call either through the traditional cellular network, as described hereinabove, or through the Internet. The Internet is based on the Internet Protocol (IP), which was developed as a standard protocol to allow different types of computers to exchange electronic mail and other files over a network. The IP specifies the addressing of nodes on the Internet and provides a method of sending packets of data from one node to another. The data is routed in datagrams and is transmitted using connection-less network services. Therefore, IP does not guarantee the reliable delivery of the data or the sequencing of the datagram.

Hence, an upper layer, such as Transmission Control Protocol (TCP) must provide this function. TCP connection-oriented services provide reliable delivery of data between the nodes by establishing a connection before the applications send data. Thus, TCP guarantees that the data is error free and in sequence. Alternatively, another upper layer, User Datagram Protocol (UDP), can be used by various applications, such as voice applications, to send messages where the integrity of the data is not as important. It should be noted that speech is not routed using the more reliable TCP/IP.

Figure 2:
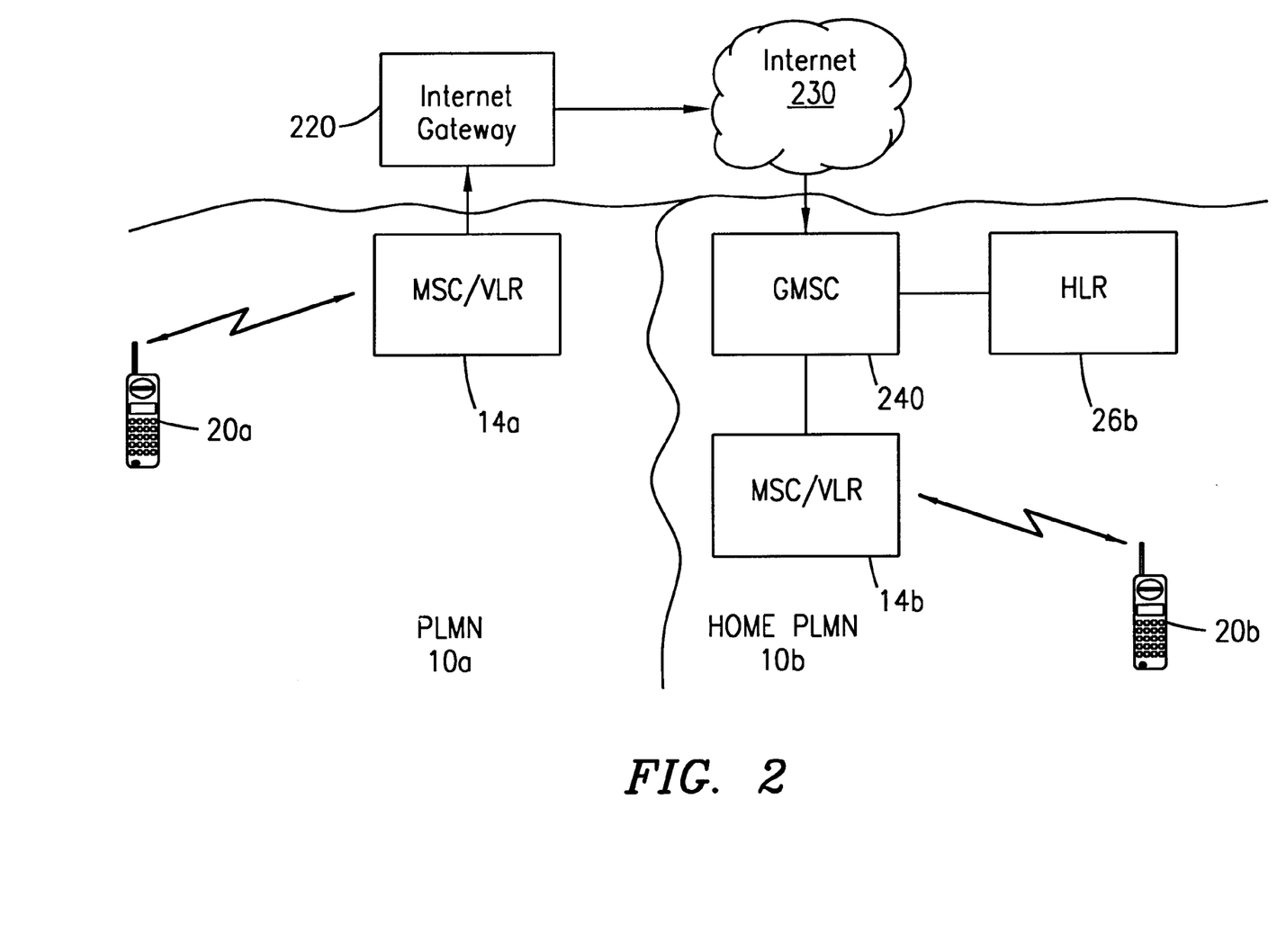
FIG. 2 illustrates the routing of a wireless call through the Internet.

As shown in FIG. 2 of the drawings, in order to use Internet telephony services, the calling mobile station 20a dials a special number, which indicates to the serving MSC/VLR 14a that the call should be routed to an Internet Gateway 220. This Internet Gateway 220 then obtains the B-number for the called mobile station 20b, converts this dialed B-number into an IP address and encapsulates this dialed B-number into an IP datagram. The Internet Gateway 220 routes the call through the Internet 230 using the IP address to a Gateway Mobile Switching Center (GMSC) 240 serving the home PLMN 10b of the called mobile station 20b. It should be understood that the IP address consists of the IP address of the GMSC 240. The GMSC 240 extracts the dialed B-number and queries the HLR 26b for routing information for the MSC/VLR 14b serving the called mobile station 20b. The GMSC 240 then routes the call to the serving MSC/VLR 14b of the called mobile station 20b to establish a call connection. Speech can then be transmitted between the calling mobile station 20a and called mobile station 20b through the Internet 230 via UDP/IP.

With reference again to FIG. 1 of the drawings, in addition to the advances in Internet telephony, MSs 20 now have the capability to take pictures with digital cameras (not shown) either attached to the MS 20 or included within the MS 20. The MS 20 can send these captured digital images (not shown) along with voice communications through the cellular network 10 and/or the Public Switched Telephone Network (PSTN) (not shown) to a receiving terminal, e.g., another MS 20 or multimedia device, for display and storage of the digital image.

However, the transmission of large amounts of data through these circuit switched networks, e.g., the cellular 10 and PSTN networks, can undesirably increase the load on the networks 10, which can affect the quality of the received digital picture. In addition, the calling MS 20 must first establish a call connection with the called party prior to sending the digital image. This can increase the time necessary for uploading the digital image from the MS 20 to the cellular network 10 and for transporting this image to the called party. Furthermore, during the time the called party is waiting to receive the digital image, the calling mobile subscriber is usually charged for all of the air time and long-distance charges for the call.

It is, therefore, an object of the present invention to reduce the load created by the transmission of digital images on the cellular and fixed networks.

It is a further object of the present invention to reduce the costs to mobile subscribers transmitting digital images to receiving terminals.

SUMMARY OF THE INVENTION

The present invention is directed to telecommunications systems and methods for transmitting digital images produced by a digital camera attached to or integrated with a mobile station from the mobile station to a receiving terminal through the Internet. A calling mobile subscriber can select the digital image to transmit and dial the number associated with the receiving terminal on the mobile station. The digital image is sent through the Internet in parallel to the sending of another telecommunications connection, such as a voice or data call setup request or a short message, through the cellular or fixed network. At the end office serving the receiving terminal, the telecommunications connection is associated with the digital image and a connection is established between the calling mobile subscriber and the receiving terminal. When the connection is established, the end office serving the receiving terminal sends the digital image to the receiving terminal. Advantageously, by sending the digital image through the Internet, the load on the cellular and fixed networks is reduced and the costs to the mobile subscriber for the transmission of digital images to a receiving terminal are reduced.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 3:
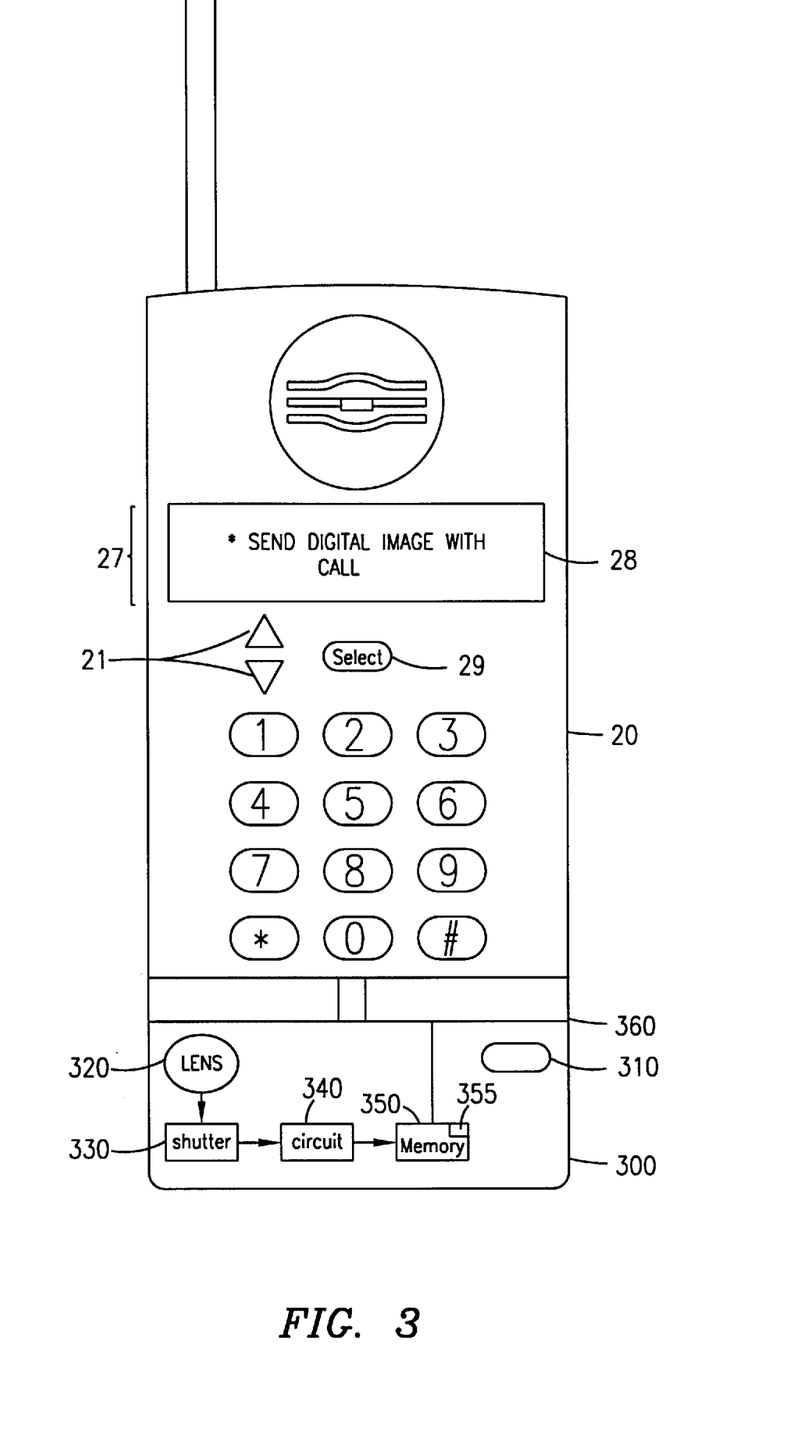
FIG. 3 illustrates a combined mobile station and digital camera for taking and storing digital images.

With reference now to FIG. 3 of the drawings, a mobile station (MS) 20 is shown having a digital camera 300 attached thereto. When a mobile subscriber associated with the MS 20 takes a picture, e.g., by pressing a shutter button 310 on the digital camera 300 causing a shutter device 330 to activate, the image within a lens 320 of the digital camera 300 is digitized by a digitizing circuit 340 and stored in a memory 350 of the digital camera 300. The lens 320 and shutter 330 are preferably solid state consisting of BGO or Germanium dopant, which provides an additional feature of IR image capture. In one embodiment, the digital camera 300 can be detachably attached to the MS 20 through an interface 360. Alternatively, the digital camera 300 can be integrated with the MS 20 instead of attached to the MS 20.

Each of the digital images 355 stored in the memory 350 of the digital camera 300 can be sent to a receiving terminal (not shown) using a user interface, which includes, for example, a display 28 and function keys, e.g., up and down arrow keys 21 and SELECT key 29, on the MS 20. The mobile subscriber can select to send one or more of the digital images 355 along with a call setup request for transmitting speech by viewing a menu 27 on the display 28 of the MS 20 and using both up and down arrow keys 21 and a SELECT key 29 or other similar function key on the MS 20.

Once the mobile subscriber has selected to send one or more of the digital images 355, the digital images 355 stored in the memory 350 of the digital camera 300 are displayed to the mobile subscriber. The mobile subscriber can scroll through the digital images 355 stored in the memory 350 using the up and down arrow keys 21 and select one or more of the digital images 355 to be sent using the SELECT key 29. The mobile subscriber can then enter the B-number associated with the receiving terminal, e.g., another MS capable of receiving and displaying digital images or a multimedia device, such as an H.323 terminal, which is a computer capable of sending and receiving speech over the Internet.

Figure 4:
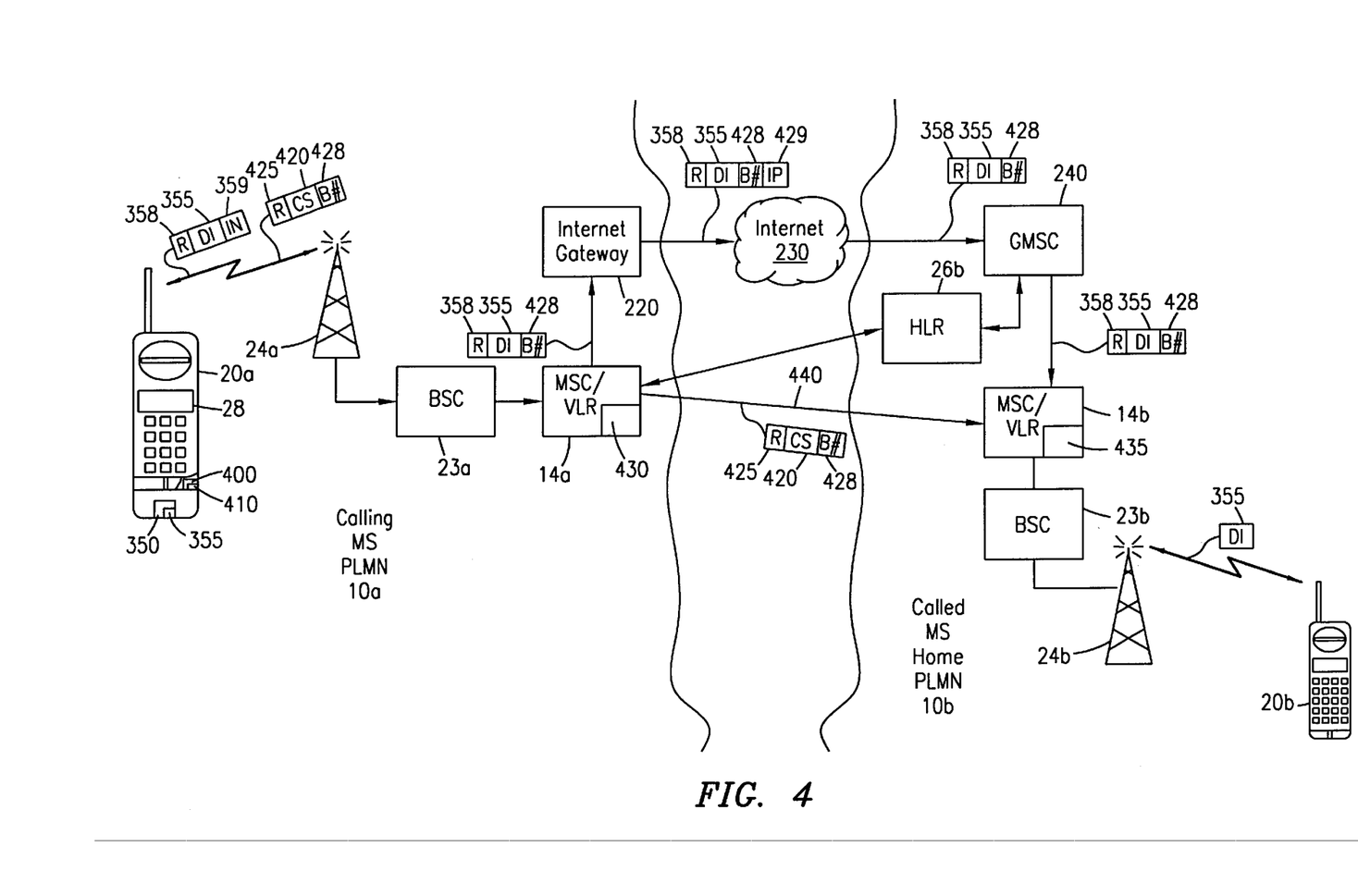
FIG. 4 illustrates the transmission of a digital image from a sending mobile station through the Internet to a receiving mobile station in accordance with the embodiments of the present invention.

FIG. 4 illustrates one embodiment of the present invention in which the receiving terminal is another MS 20b. In this embodiment, one of the digital images 355 has been selected and the mobile subscriber has dialed the B-number 428 associated with the called MS 20b. In order to send this selected digital image 355 to the called MS 20b, an association application 410 within a memory 400 of the calling MS 20a associates a first reference 425 with a telecommunications connection, such as a voice or data call setup request or a short message. In FIG. 4, the telecommunications connection is shown as a call setup request 420, for simplicity. The associated application 410 also associates a second reference 358 with the digital image 355. The first 425 and second 358 references can be, for example, identical sets of numbers, and are used to correlate the call setup request 420 and the digital image 355 such that they may be matched up at the MSC/VLR 14b of the called MS 20b.

The calling MS 20a sends the call setup request 420, dialed B-number 428 and associated first reference 425 to a Mobile Switching Center/Visitor Location Register (MSC/VLR) 14a within a Public Land Mobile Network (PLMN) 10a serving the calling MS 20a via a Base Transceiver Station (BTS) 24a and a Base Station Controller (BSC) 23a using a Stand Alone Dedicated Control Channel (SDCCH) The calling MS 20a then transmits the selected digital image 355 to the MSC/VLR 14a along with the second reference 358 and an indication 359 that the digital image 355 should be routed through the Internet 230. The digital image 355 can be transmitted over the air interface to the MSC/VLR 14a using USSD or GPRS. From the indication 359 and dialed B-number 428, the MSC/VLR 14a can determine an Internet Protocol (IP) address for a Gateway Mobile Switching Center (GMSC) 240 serving the home PLMN 10b of the called MS 20b, or alternatively, the MSC/VLR 14b can forward the digital image 355 and dialed B-number 428 to an Internet Gateway 220 to determine the IP address for the GMSC 240, the latter being illustrated.

Correlation logic 430 within the MSC/VLR 14a correlates the first 425 and second 358 references together by ensuring that the first 425 and second 358 references identify the call setup request 420 and digital image 355 as being associated with each other. When the digital image 355 and associated second reference 358 are received by the MSC/VLR 14a, the MSC/VLR 14a routes the digital image 355 and associated second reference 358 to the Internet Gateway 220. The Internet Gateway 220 sends the B-number 428, digital image 355 and associated second reference 358 through the Internet 230 to the GMSC 240 indicated by the IP address 429. It should be noted that the digital image 355 can be sent using any available format, such as gif, jpg or t4.

When the GMSC 240 receives the digital image 355, associated second reference 358 and B-number 428, the GMSC 240 extracts the B-number 428 of the called MS 20b, queries a Home Location Register (HLR) 26b associated with the called MS 20b for routing information for the called MS 20b and routes the digital image 355 and associated second reference 358 to the MSC/VLR 14b serving the called MS 20b. The second reference 358 indicates to the MSC/VLR 14b serving the called MS 20b that the digital image 355 is associated with a call setup request 420. Thus, the MSC/VLR 14b serving the called MS 20b does not attempt to transmit the digital image 355 to the called MS 20b until the call setup request 420 is received from the MSC/VLR 14a serving the calling MS 20a and a call connection is established.

Substantially simultaneous to the transmission of the digital image 355 through the Internet 230, the MSC/VLR 14a serving the calling MS 20a attempts to establish a call connection between the calling MS 20a and the called MS 20b by requesting the BSC 23a serving the calling MS 20a to allocate a free traffic channel (TCH). This request is forwarded to the BTS 24a serving the calling MS 20a and to the calling MS 20a to activate the allocated TCH. The MSC/VLR 14a serving the calling MS 20a queries the HLR 26b associated with the called MS 20b to obtain routing information for the called MS 20b, e.g., the address of the MSC/VLR 14b serving the called MS 20b. The call setup request 420 and the associated first reference 425 are then routed to the MSC/VLR 14b serving the called MS 20b through a circuit switched connection 440. The first reference 425 indicates to the MSC/VLR 14b serving the called MS 20b that the call setup request 420 is associated with a digital image 355. Therefore, the MSC/VLR 14b serving the called MS 20b does not attempt to establish a call connection until the digital image 355 is received.

In preferred embodiments of the present invention, once the digital image 355 is received by the MSC/VLR 14b serving the called MS 20b, a message (not shown) indicating that the digital image 355 was received is transmitted back to the calling MS 20a through the cellular network 440 using, for example, a Short Message Service (SMS) message, which is displayed on the MS display 28 to the mobile subscriber. Therefore, the calling mobile subscriber remains informed about the status of the call.

Once the MSC/VLR 14b serving the called MS 20b receives the digital image 355, the associated second reference 358, the call setup request 420 and the associated first reference 425, comparison logic 435 within the MSC/VLR 14b serving the called MS 20b compares the first 358 and second 425 references to determine that the digital image 355 and call setup request 420 are associated with each other. After the MSC/VLR 14b serving the called MS 20b has confirmed that both parts (digital image 355 and call setup request 400) have been received, the MSC/VLR 14b serving the called MS 20b pages the called MS 20b via a serving BSC 23b and BTS 24b, and when the called MS 20b responds, a traffic channel is allocated to the called MS 20b. The called MS 20b then rings, and when the called mobile subscriber answers, the call connection is established. Substantially immediately after the call connection is established, the MSC/VLR 14b serving the called MS 20b transmits the digital image 355 to the called MS 20b for display to the called mobile subscriber. Preferably, voice communications between the calling mobile station 20a and called mobile station 20b can occur simultaneous to the transmission of the digital image 355 to the called MS 20b.

It should be noted that the received digital image 355 and call setup request 420 should not interfere with existing supplementary services subscribed to by the called MS 20b, such as calling line ID. For example, if the called MS 20b does not allow calls from calling parties who do not provide identification, the serving MSC/VLR 14b will not transmit the digital image 355 or set up a call connection to the called MS 20b if the calling MS 20a does not provide calling party identification.

It should be further noted that if the received digital image 355 is not in a format compatible with the called MS's 20b displaying abilities, the MSC/VLR 14b serving the called MS 20b, can return a message (not shown) to the calling MS 20a requesting that the digital image 355 be re-transmitted in a compatible format, along with the associated second reference 358. Either the called MS 20b can transmit the incompatible message along with a list of compatible formats (not shown) to the serving MSC/VLR 14b, or alternatively, and preferably, the serving MSC/VLR 14b can store the list of compatible formats and compare the format of the received digital image 355 with the list of compatible formats associated with the called MS 20b.

Figure 5:
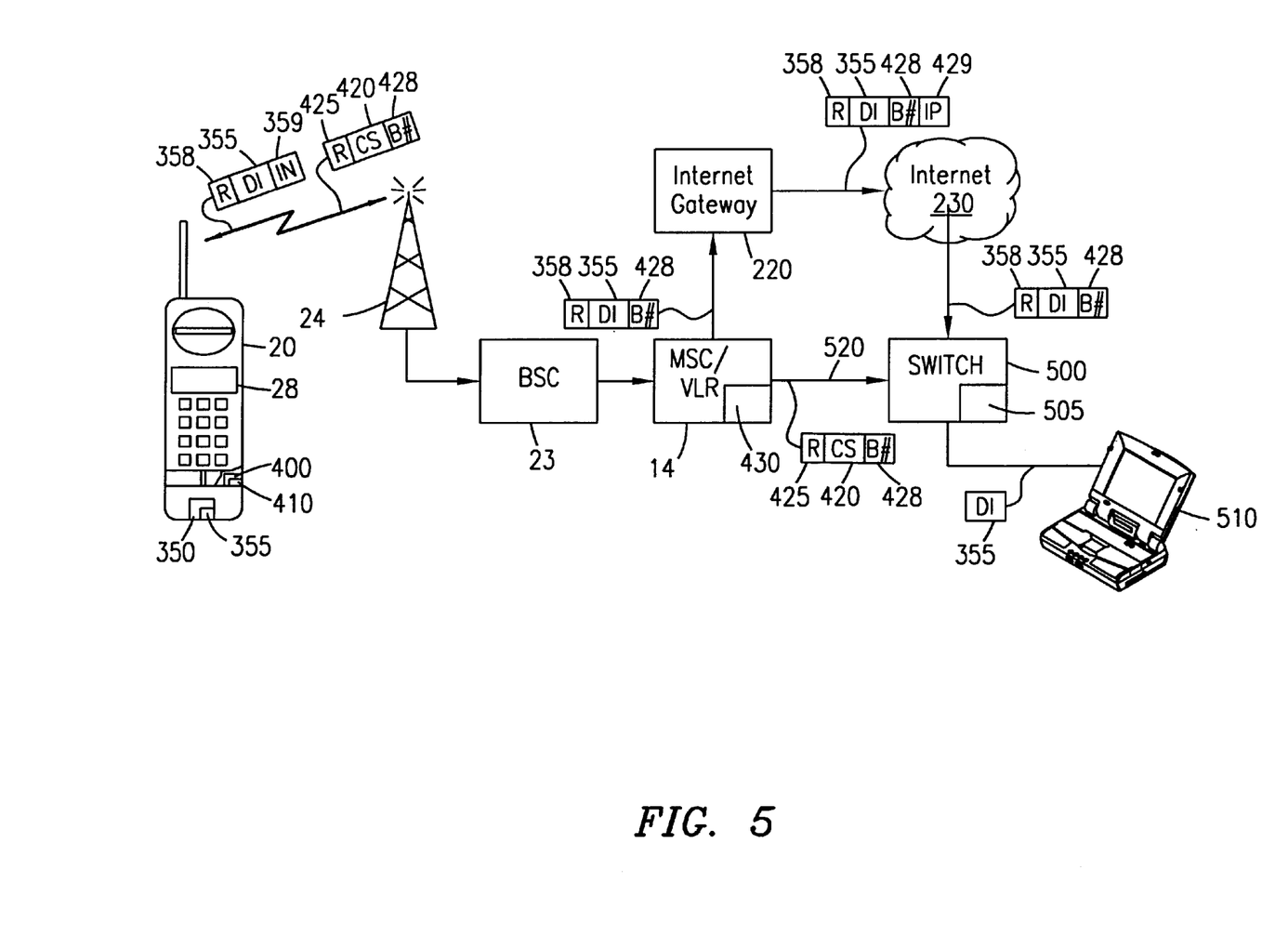
FIG. 5 illustrates the transmission of a digital image from a sending mobile station through the Internet to a receiving H.323 terminal in accordance with the embodiments of the present invention.

In an alternative embodiment, as shown in FIG. 5 of the drawings, the receiving terminal is an H.323 terminal 510 capable of sending and receiving voice messages. In this embodiment, the Internet Gateway 220 converts the B-number 428 of the H.323 terminal 510 into the IP address 429 of a switch 500 associated with the H.323 terminal 510. The Internet Gateway 220 routes the digital image 355 and associated second reference 358 to the switch 500 through the Internet 230 using the IP address 420, while the MSC/VLR 14 serving the calling MS 20 routes the call setup request 420 and associated first reference 425 to the switch 500 through a circuit switched connection, e.g., the PSTN 520.

Comparison logic 505 within the switch 500 uses the first 425 and second 358 references to correlate the call setup request 420 with the digital image 355. The switch 500 then establishes a call connection with the H.323 terminal 510 and transmits the digital image 355 to the H.323 terminal 510.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A telecommunications system for transmitting a digital image in association with a call connection, comprising:
    a mobile station having a digital camera associated therewith, said digital camera storing at least one digital image taken by said digital camera;
    means for associating a first reference with said digital image and a second reference with a call setup request, wherein said first reference and said second reference identify said digital image and said call setup request as being associated with each other;
    a mobile switching center for receiving said digital image, said associated first reference, said call setup request and said associated second reference from said mobile station, said mobile switching center correlating said first and second references together, said mobile switching center routing said digital image and said associated first reference through an Internet and routing said call setup request and said associated second reference through a circuit connection;
    an end office for receiving said digital image and said associated first reference via said Internet and receiving said call setup request and said associated second reference via said circuit connection, said end office comparing said first and second references to determine that said first and second references are associated with each other, said end office establishing said call connection between said mobile station and a receiving terminal using said received call setup request and transmitting said digital image to said receiving terminal when said call connection is established.

2. The telecommunications system of claim 1, wherein voice communications between said mobile station and said receiving terminal are transmitted through said call connection substantially simultaneous to the transmission of said digital image from said end office to said receiving terminal.

3. The telecommunications system of claim 1, further comprising an Internet Gateway for routing said digital image and said associated first reference through said Internet, said mobile switching center routing said digital image and said associated first reference to said Internet Gateway.

4. The telecommunications system of claim 3, wherein said mobile station transmits a B-number associated with said receiving terminal to said mobile switching center.

5. The telecommunications system of claim 4, wherein said end office is a second mobile switching center and said receiving terminal being a second mobile station.

6. The telecommunications system of claim 5, further comprising:
    a Gateway Mobile Switching Center serving a home area associated with said second mobile station; and
    wherein said Internet Gateway converts said B-number into an Internet Protocol address for said Gateway Mobile Switching Center and routes said digital image and said associated first reference to said Gateway Mobile Switching Center through said Internet using said Internet Protocol address.

7. The telecommunications system of claim 4, wherein said end office is a switch and said receiving terminal being an H.323 terminal.

8. The telecommunications system of claim 7, wherein said Internet Gateway converts said B-number into an Internet Protocol address for said switch and routes said digital image and said associated first reference to said switch through the Internet using said Internet Protocol address.

9. The telecommunications system of claim 1, wherein said digital camera is attached to said mobile station.

10. The telecommunications system of claim 1, wherein said digital camera is integrated with said mobile station.

11. The telecommunications system of claim 1, wherein said mobile station comprises:
    a user interface for selecting said digital image.

12. A mobile station for transmitting a digital image in association with a cell connection, comprising:
    a digital camera for storing at least one digital image taken by said digital camera;
    means for associating a first reference with a selected digital image and a second reference with a call setup request, wherein said first and second references identify said selected digital image and said call setup request as being associated with each other;
    means for transmitting said call setup request, said associated second reference, a B-number associated with a called subscriber, said digital image, said associated first reference and an Internet number to a wireless communication system.

13. The mobile station of claim 12, wherein said digital camera is attached to said mobile station.

14. The mobile station of claim 12, wherein said digital camera is integrated with said mobile station.

15. The mobile station of claim 12, further comprising means for selecting said selected digital image.

16. The mobile station of claim 15, wherein said means for selecting comprises a user interface.

17. The mobile station of claim 12, further comprising:
    a memory for storing said Internet number.

18. The mobile station of claim 12, wherein said first and second references are identical sets of numbers.

19. A mobile switching center for transmitting a digital image in association with a call connection, comprising:
    means for receiving a call setup request and an associated first reference and at least one digital image and an associated second reference from a mobile station in wireless communication with said mobile switching center;
    a logical circuit for correlating said first and second references together;
    means for routing said digital image and said associated second reference through an Internet; and
    means for routing said call setup request and said associated first reference through a circuit connection.

20. The mobile switching center of claim 19, wherein said circuit connection comprises the Public Land Mobile Network.

21. The mobile switching center of claim 19, wherein said circuit connection comprises the Public Switched Telephone Network.

22. An end office for transmitting a digital image in association with a call connection, comprising:
  means for receiving a call setup request and an associated first reference through a circuit connection;
  means for receiving at least one digital image and an associated second reference through an Internet;
  a logical circuit for comparing said first and second references to determine that said first and second references are associated with each other;
  means for establishing a call connection with a receiving terminal served by said end office using said call setup request; and
  means for transmitting said digital image to said receiving terminal upon establishing said call connection.

23. The end office of claim 22, wherein said end office is a switch.

24. The end office of claim 23, wherein said receiving terminal is an H.323 terminal.

25. The end office of claim 22, wherein said end office is a mobile switching center.

26. The end office of claim 25, wherein said receiving terminal is a mobile station.

27. The end office of claim 22, wherein said means for transmitting further enables voice communications to be sent to said receiving terminal substantially simultaneous to the transmission of said digital image.

28. A method for transmitting a digital image in association with a call connection, comprising the steps of:
  receiving, by a mobile switching center in wireless communication with a mobile station, a call setup request and an associated first reference from said mobile station and at least one digital image and an associated second reference;
  correlating said first and second references together such that said first and second references identify said call setup request and said digital image as being associated with each other;
  routing said digital image and said associated second reference through an Internet to an end office; and
  routing said call setup request and said associated first reference through a circuit connection to said end office.

29. The method of claim 28, further comprising the step of:
  associating, by said mobile station, said first reference with said call setup request and said second reference with said at least one digital image.

30. The method of claim 29, wherein said step of routing said digital image further comprises the steps of:
  routing said digital image and said associated second reference from said mobile switching center to an Internet Gateway; and
  routing said digital image and said associated first reference through said Internet, by said Internet Gateway.

31. The method of claim 30, further comprising the steps of:
  receiving, by said end office serving a receiving terminal, said digital image and said associated second reference through said Internet;
  receiving, by said end office, said call setup request and said associated first reference through said circuit connection;
  comparing, by said end office, said first and second references to determine that said first and second references are associated with each other;
  establishing, by said end office, a call connection between said mobile station and said receiving terminal using said call setup request after said comparison; and
  transmitting said digital image from said end office to said receiving terminal upon establishing said call connection.

32. The method of claim 31, further comprising the step of:
  transmitting voice communications between said mobile station and said receiving terminal through said call connection substantially simultaneous to said step of transmitting said digital image from said end office to said receiving terminal.

33. The method of claim 32, further comprising the step of:
  transmitting a B-number associated with a receiving terminal from said mobile station to said mobile switching center.

34. The method of claim 33, wherein said end office is a second mobile switching center, said receiving terminal being a second mobile station, said step of routing said digital image and said associated second reference through said Internet by said Internet Gateway further comprising the steps of:
  converting, by said Internet Gateway, said B-number into an Internet Protocol address for a Gateway Mobile Switching Center serving a home area associated with said second mobile station; and
  routing said digital image and said associated second reference to said Gateway Mobile Switching Center through said Internet using said Internet Protocol address.

35. The method of claim 33, wherein said end office is a switch, said receiving terminal being an H.323 terminal, said step of routing said digital image and said associated second reference through said Internet by said Internet Gateway further comprising the steps of:
  converting, by said Internet Gateway, said B-number into an Internet Protocol address for said switch; and
  routing said digital image and said associated second reference to said switch through said Internet using said Internet Protocol address.

36. A method for transmitting a digital image in association with a call connection, comprising the steps of:
  receiving, by an end office serving a receiving terminal, a call setup request and an associated first reference through a circuit connection;
  receiving, by said end office, at least one digital image and an associated second reference through an Internet;
  comparing, by said end office, said first and second references to determine that said first and second references are associated with each other;
  establishing a call connection with said receiving terminal served by said end office using said call setup request; and
  transmitting said digital image to said receiving terminal upon establishing said call connection.

37. The method of claim 36, further comprising the step of:
  transmitting voice communications to said receiving terminal substantially simultaneous to said step of transmitting said digital image.

* * * * *